United States Patent
Graville

[15] 3,674,973
[45] July 4, 1972

[54] LAYDOWN ELECTROSLAG WELDING PROCESS

[72] Inventor: Brian Anthony Graville, Ville La Salle, Quebec, Canada

[73] Assignee: Dominion Bridge Company Limited, Montreal, Quebec, Canada

[22] Filed: May 6, 1971

[21] Appl. No.: 140,731

[30] Foreign Application Priority Data

March 22, 1971 Canada..................108,393

[52] U.S. Cl................................219/73, 219/137
[51] Int. Cl.................................B23k 9/18
[58] Field of Search.....................219/73, 130–137

[56] References Cited

UNITED STATES PATENTS

| | | | |
|---|---|---|---|
| 3,515,846 | 6/1970 | Nakamura | 219/137 |
| 3,139,505 | 6/1964 | Kirschning | 219/73 |
| 3,205,339 | 9/1965 | Burden et al | 219/73 X |

*Primary Examiner*—J. V. Truhe
*Assistant Examiner*—L. A. Schutzman
*Attorney*—Fetherstonhaugh & Co.

[57] ABSTRACT

An electroslag welding process is described for welding metal workpieces, in which a consumable electrode is melted by contact with a molten slag pool supported in contact with surfaces of the workpieces onto which the metal from the electrodes is deposited. According to the novel feature, the workpiece surfaces together form a horizontally extending groove and the consumable electrode is placed horizontally within the groove surrounded by flux and at a distance from the workpieces greater than that at which arcing to the workpieces occurs during welding, whereby the electrode is progressively melted by the molten slag pool along the length of the groove with the molten electrode metal collecting at the bottom of the slag pool to form a weld joining the workpieces.

5 Claims, 4 Drawing Figures

PATENTED JUL 4 1972      3,674,973

*INVENTOR*
Brian Anthony GRAVILLE

*Fetherstonhaugh & Co.*
*PATENT AGENTS*

LAYDOWN ELECTROSLAG WELDING PROCESS

This invention relates to a method for electroslag welding, and more particularly to a method for laydown electroslag welding in which a consumable electrode is consumed in a bath of molten slag supported in contact with a surface onto which metal from the electrode is deposited.

The electroslag welding is a welding process whereby heat is generated by passing an electric current between an electrode and a metal base, e.g. metal workpieces, via a slag pool. The slag pool is heated to a temperature in excess of the melting point of the base and filler metals. The electro-conductivity of the slag increases with high temperatures and it fuses to the face of the metal workpieces with the electrode immersed in it. The molten base metal and filler metal collect at the bottom of the slag pool and form the weld pool, which, when solidifying, forms a weld and joins the workpiece surfaces.

The main function of the slag in electroslag welding is to transform electrical energy into thermal energy, and therefore a very important property of slag is its electro-conductivity and the variation thereof with temperature. The electrical conductivity of fused slag or flux increases rapidly with a rise in temperature and, below certain temperatures, particularly when solid, most slags or fluxes become practically non-conducting.

Electroslag welding normally is carried out along a vertical axis and molding plates are normally disposed around the metal workpieces to hold the molten slag and metal and to help shape the weld. These molding plates can also act as cooling plates and commonly are used in the form of hollow slidable copper plates with cooling water passing through. As the electrode wire is melted into the slag pool and as the slag pool cools, the copper plates are slid vertically along the weld axis.

A typical electroslag welding method is described in Suzuki, et al U.S. Pat. No. 3,352,993, issued Nov. 14, 1967. This process is normally used only for making vertical welds in heavy plate and, because of the geometric limitations of the copper plates, the electroslag welds are necessarily large and therefore suffer from the detrimental metallurgical effects associated with a high heat input.

It has long been known to make laydown welds by the so-called "fire-cracker" or "lay-down" arc welding technique in which a covered electrode is placed in a groove and allowed to burn freely. A method of this type is described in Applegate, U.S. Pat. No. 1,953,942, issued Apr. 10, 1934. Since the cross-sectional area of the electrode must be the same as that of the desired weld, a limit to the size of the weld is imposed by the need to maintain a high current density.

In accordance with the present invention, a horizontal welding process is provided in which a solid consumable electrode is placed in a groove between metal workpieces to be welded. The electrode is spaced from the workpiece surfaces and is surrounded by a flux. When a current is passing through the electrode, a molten slag pool is formed adjacent the end of the electrode and the current passing through this molten slag pool between the end of the electrode and the workpieces raises the temperature of the pool sufficiently to cause it to melt the end of the electrode. Thus, as the electrode melts, the pool of molten slag progresses freely along the length of the joint, melting the electrode as it goes. As this occurs, the molten electrode metal collects at the bottom of the slag pool to form a weld pool, which when solidified, forms a weld and joins the workpieces together.

In order to start the above process, it is necessary to first melt a small quantity of flux at the tip of the electrode to thus start the formation of the molten pool. This can be done in a variety of ways and one convenient method is to have a small piece of wire inserted between the tip of the electrode and the workpiece. When the current is turned on, this wire melts like a fuse and heats the flux. When the flux melts, it becomes a conductor and the process has started.

Since the flux surrounding the electrode is not an effective conductor until it is hot, it remains an effective insulator until it becomes a part of the slag pool. It is this property of the flux to conduct electricity when hot and act as an insulator when cold, which causes the pool of molten slag to progress freely along the length of the joint from one end to the other and thus to automatically produce a weld connection along the length of the joint.

The process of this invention has the advantages that more stable conditions are achieved, lower current or larger electrodes can be used, spatter is eliminated and there is a potential refining of the weld metal by action with the flux. Moreover, one of its greatest advantages is for welding inaccessible joints, since there is no welding head or equipment positioned above the weld.

The electrode must be spaced from the workpiece surfaces a sufficient distance that substantially no arcing to the workpieces occurs during the welding. The distance at which arcing to the workpieces occurs may vary according to the characteristics of the flux used to form the slag pool.

A wide variety of commercially available fluxes can be used in accordance with the invention and these will usually contain silicone dioxide, calcium oxide, magnesium oxide, manganous oxide and aluminum oxide. The fluxes may also contain fluorides such as calcium fluoride. A typical suitable flux is Linde 124 flux.

In the drawings which illustrate certain preferred embodiments of this invention:

Figure 1:
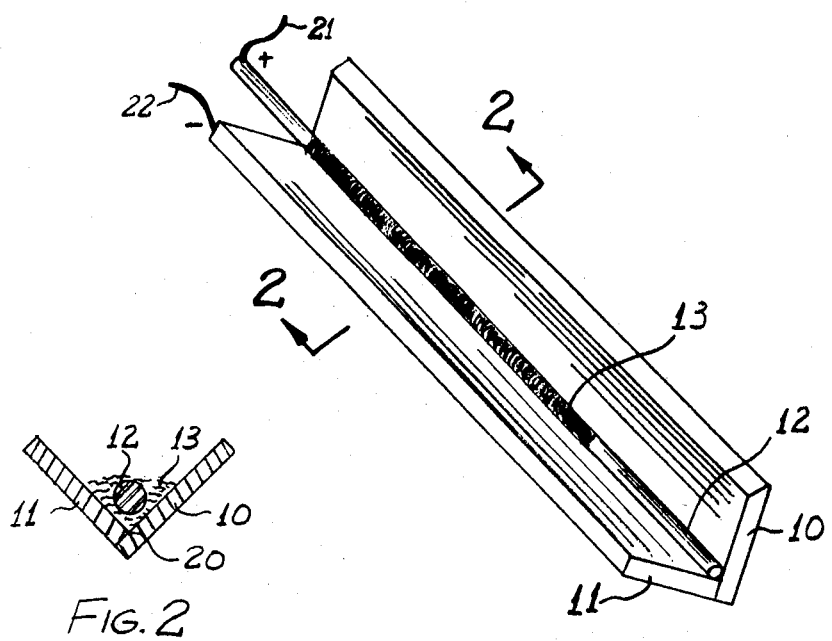
FIG. 1 is a perspective view illustrating generally the welding arrangement of the invention.
Figure 2:
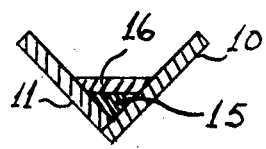
FIG. 2 is a vertical section along lines 2—2.

As will be seen from FIG. 1, a pair of metal plates 10 and 11 are arranged in a V-shaped configuration with an apex 20 forming a horizontal joining line between the two plates. Positioned along the length of this joint is a solid, consumable electrode 12. This electrode 12 is surrounded by particulate solid flux 13 and is spaced from the metal plates 10 and 11 by the distance R.

The insulating properties of the solid, particulate flux together with the spacing R must be sufficient to prevent arcing between the electrode 12 and the plates 10 and 11 during operation. For most operations a spacing R of about one-sixteenth inch is usually satisfactory.

Figure 3:
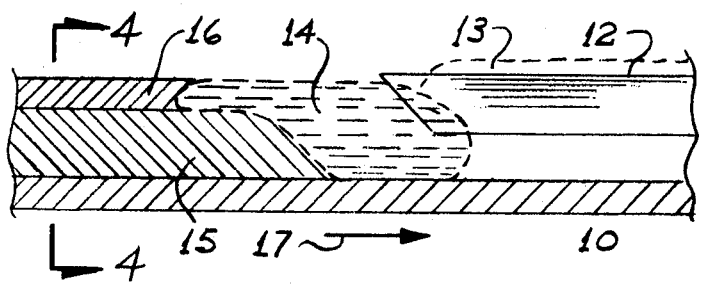
FIG. 3 is a vertical, longitudinal section showing a schematic illustration of the welding action.
Figure 4:
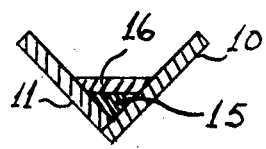
FIG. 4 is a vertical section through a welded connection.

The electrode 12 and plates 10 and 11 are connected electrical leads 21 and 22, respectively and current is applied. This current passes between the end of the electrode 12 and the plates 10 and 11 and initially heats a portion of the flux adjacent this end sufficiently to cause it to melt. When the flux melts, it forms a molten pool 14, as shown in FIG. 3, through which the current continues to flow. The pool 14 is a good conductor and its temperature rises due to the current flow until it is higher than the melting point of the electrode 12 and the plates 10 and 11. At this stage, the end of the electrode commences to melt and flows into the molten slag pool.

The continuous flow of current maintains the slag pool 14 at a high temperature which in turn causes a continuous melting of flux 13 and electrode 12. This results in a continuous movement of the slag pool 14 in the direction of arrow 17 in FIG. 3. As this pool 14 progresses along, the molten weld or filler settles to the bottom and cools to form a fillet weld 15 with a layer of slag 16 solidified on top. Butt welds can also be made in a similar manner.

Thus, it will be seen that with the process of this invention, once the equipment has been set up it is merely a matter of applying the current and a horizontal fillet weld is automatically formed on a continuous basis from one end of the joint to the other.

The invention is further illustrated by the following non-limitative example:

EXAMPLE 1

A pair of steel plates 12 inches long were positioned to form a horizontal groove therebetween. A ⅝-inch diameter welding rod was positioned horizontally between the two plates at a distance of three thirty-seconds inch from each. The rod was surrounded by Linde 124 flux and the rod and plates were connected to electrical leads. The test plates were marked at intervals of 3 inches and the welding parameters were recorded every 3 inches as the weld progressed.

The readings obtained are shown in Table 1 below.

TABLE 1

| Distance (inches) | 3 | 6 | 9 | 12 |
|---|---|---|---|---|
| Amperes | 500–600 | 575–600 | 600–700 | 600–700 |
| Volts | 31 | 31 | 30 | 30 |
| Time (sec.) | 103 | 0 | 50 | 50 |

Mean travel speed during first 6 inches — 2.2 inches per min.
Mean travel speed during second 6 inches — 3.6 inches per min.
Mean deposition rate during first 6 inches — 0.34 lbs/1000amps/min.
Mean deposition rate during second 6 inches — 0.56 lbs/1000amps/min.
Mean energy input during first 6 inches — 460 KJ/in.
Mean energy input during second 6 inches — 285 KJ/in.

EXAMPLE 2

The procedure of Example 1 was repeated using a pair of 15-inch long plates and the readings obtained are shown in Table 2 below.

TABLE 2

| Distance (inches) | 3 | 6 | 9 | 12 | 15 |
|---|---|---|---|---|---|
| Amperes | 500–600 | 500–650 | 500–700 | 500–700 | 400–600 |
| Volts | 27 | 27 | 32 | 27 | 37 |
| Time (sec.) | 50 | 55 | 55 | 50 | 50 |

| | |
|---|---|
| Mean travel speed | 3.6 inches/min. |
| Mean deposition rate | 0.56 lb/1,000 amps/min. |
| Mean energy input | 250 KJ/in. |

EXAMPLE 3

A test was conducted to determine the optimum spacing between the electrode and workpieces being welded.

Using a Glen Pacific welding machine with minimum slope, a pair of steel workpieces were positioned to provide a horizontal groove therebetween. A ⅝-inch diameter coated electrode was positioned between the workpieces and was held at a slight angle to provide an electrode/workpiece spacing which varied from one-sixteenth inch to seven-sixteenths inch. The electrode was surrounded with flux available under the trademark AYCOS BU 475 and a current was then passed through the electrode.

The readings obtained are shown in Table 3 below.

TABLE 3

| Electrode spacing (in.) | 1/16 | ⅛ | 3/16 | ¼ | 5/16 | ⅜ | 7/16 |
|---|---|---|---|---|---|---|---|
| Distance (in.) | 0 | 3 | 6 | 9 | 12 | 15 | 18 |
| Amperes | | 500–600 | 500–590 | 500–550 | 500–600 | 300–400 | 250–300 |
| Volts | | 22–25 | 22 | 22 | 22 | 22 | |
| Time (sec.) | | 55 | 75 | 120 | 90 | (Several minutes) | |

The following observations were made:

Welding was steady with practically no spitting of the slag. The welding speed decreased as the space increased and was accompanied by a decrease in current, voltage appeared steady.

At one-fourth inch spacing, voltage was increased (on machine) and the pool temperature rose. This resulted in an increased speed and current. As the spacing increased further, there was a further decrease of current and welding speed until three-eighths inch when the test was discontinued.

After removal of the slag, the toe areas were examined. From one-sixteenth to three-sixteenths inch washing was good and there was no undercut. From three-sixteenths to one-fourth inch there was some undercut, which became more noticeable at one-fourth inch. At seven-sixteenths inch there was no fusion of the faces and the deposit was a resolidified rod.

The embodiments of the invention in which an exclusive property or privilege is claimed are defined as follows:

1. A laydown electroslag welding process, comprising the steps of:
   a. placing metal workpieces together so as to form a groove which has its major axis extending in a horizontal direction;
   b. depositing a particulate solid flux in the groove;
   c. placing a consumable electrode horizontally in the groove so that it is surrounded by the flux and spaced thereby from the metal workpieces by a distance sufficient to prevent arcing;
   d. applying a potential difference to the electrode and to the workpieces so that the particulate solid flux is melted by passage of current therethrough and forms a molten slag pool in which the electrode is melted progressively along the length of the groove; and
   e. permitting the molten electrode to collect and cool at the bottom of the slag pool, thereby forming a weld for bonding the workpieces together.

2. A process according to claim 6, wherein the electrode is spaced from the workpieces by a distance of about one-sixteenth to one-fourth inch.

3. A process according to claim 2, wherein the workpieces are steel plates.

4. A process according to claim 6, wherein the process is started by first melting a small quantity of flux at the tip of the electrode to thus start the formation of the molten pool.

5. A process according to claim 4, wherein the small quantity of flux is initially melted by inserting a small piece of wire between the tip of the electrode and a workpiece, which wire melts in the manner of a fuse and heats the flux when current is applied.

* * * * *